United States Patent [19]

Matsuzaki et al.

[11] Patent Number: 5,238,089
[45] Date of Patent: Aug. 24, 1993

[54] SQUEAK PREVENTION FOR DISC BRAKE

[75] Inventors: Mikio Matsuzaki; Toru Yoshino; Toshitaka Izumihara, all of Saitama, Japan

[73] Assignees: Akebono Brake Industry Co., Ltd., Tokyo; Akebono Research and Development Centre, Ltd., Hanyu, both of Japan

[21] Appl. No.: 921,608

[22] Filed: Aug. 3, 1992

Related U.S. Application Data

[63] Continuation of Ser. No. 629,683, Dec. 18, 1990, abandoned.

[30] Foreign Application Priority Data

Dec. 20, 1989 [JP] Japan .................. 1-328207

[51] Int. Cl.$^5$ .............................. F16D 65/10
[52] U.S. Cl. .............. 188/18 A; 188/218 XL; 74/574
[58] Field of Search ............. 188/17, 218 R, 218 XL, 188/18 A; 192/30; 74/574

[56] References Cited

U.S. PATENT DOCUMENTS

| | | | |
|---|---|---|---|
| 3,286,799 | 11/1966 | Shilton | 188/218 |
| 3,422,662 | 1/1969 | Marcheron | 188/218 XL |
| 3,469,658 | 9/1969 | Forsythe | 188/218 XL |
| 3,759,354 | 9/1973 | Dowell et al. | 188/218 XL |
| 3,983,973 | 10/1976 | Zboralski et al. | 188/218 A |
| 4,132,294 | 1/1979 | Poli | 188/218 XL |
| 4,747,473 | 5/1988 | Bok et al. | 188/218 XL |
| 4,760,898 | 8/1988 | Nyquist | 188/218 XL |

FOREIGN PATENT DOCUMENTS

| | | |
|---|---|---|
| 205713 | 12/1986 | European Pat. Off. . |
| 54-108880 | 7/1979 | Japan . |
| 934096 | 8/1963 | United Kingdom . |
| 940882 | 11/1963 | United Kingdom . |
| 1114296 | 5/1968 | United Kingdom . |
| 1190826 | 6/1970 | United Kingdom . |
| 1219821 | 1/1971 | United Kingdom . |
| 1415900 | 12/1975 | United Kingdom . |
| 2015667 | 12/1979 | United Kingdom . |
| 2070164 | 9/1981 | United Kingdom . |
| 2232449 | 12/1990 | United Kingdom . |

*Primary Examiner*—Robert J. Oberleitner
*Assistant Examiner*—Lee W. Young
*Attorney, Agent, or Firm*—Cushman, Darby & Cushman

[57] ABSTRACT

A device for preventing the squeak in a disc brake apparatus in which friction pads comprised of a semi-metallic or a non-asbestos material are pushed onto a disc rotor to perform braking is characterized in that the disc rotor is circumferentially divided by the use of slits or couplings so that the frequency of second-order resonance in the longitudinal vibration of the rotor is higher than 15 kHz and thus inaudible to humans.

6 Claims, 5 Drawing Sheets

THE DIAMETERS FOR THE PROPAGATION OF LONGITUDINAL WAVES AND THE SIZES OF DISC ROTORS (a) TRANSVERSE WAVE

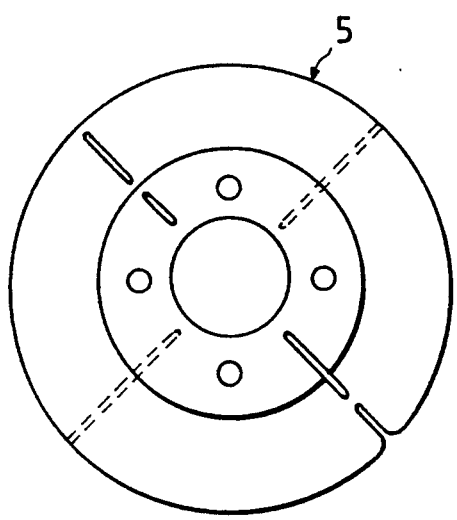
FIG. 5a
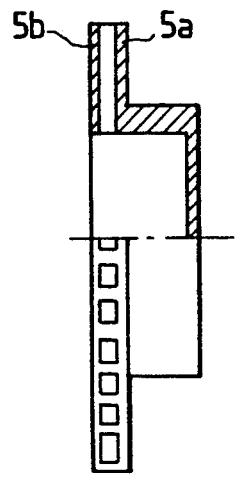
FIG. 5b
FIG. 6b
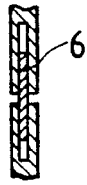
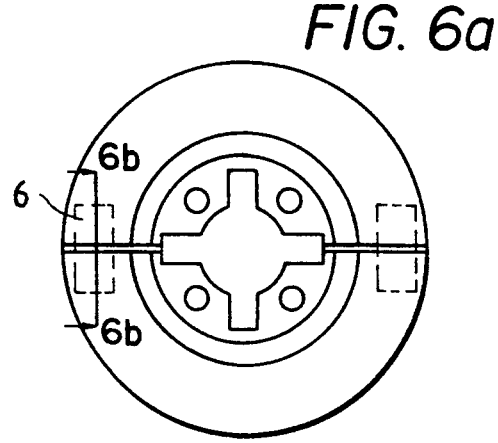
FIG. 6a
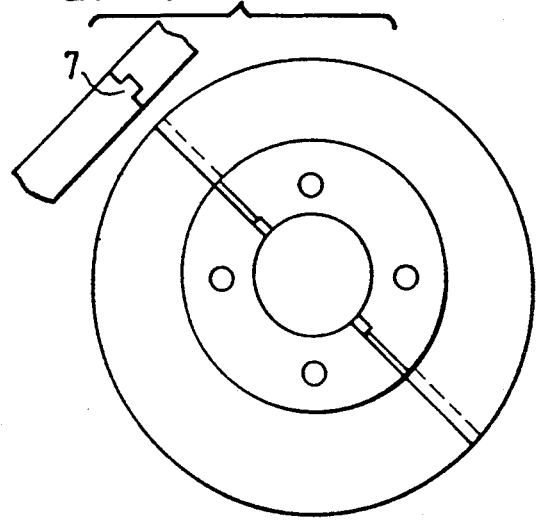
FIG. 7

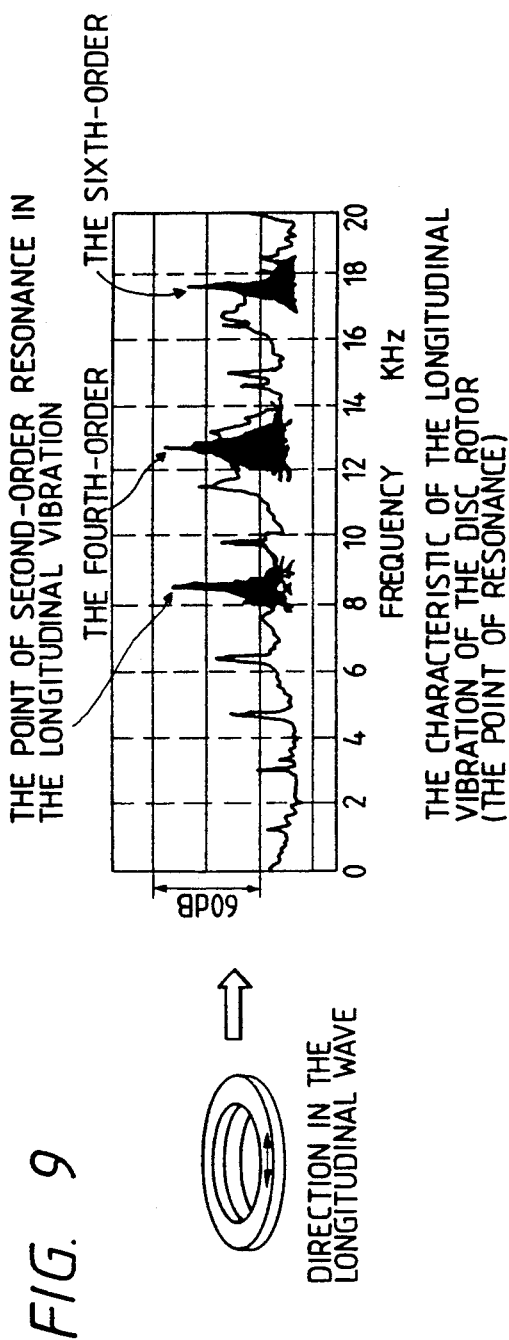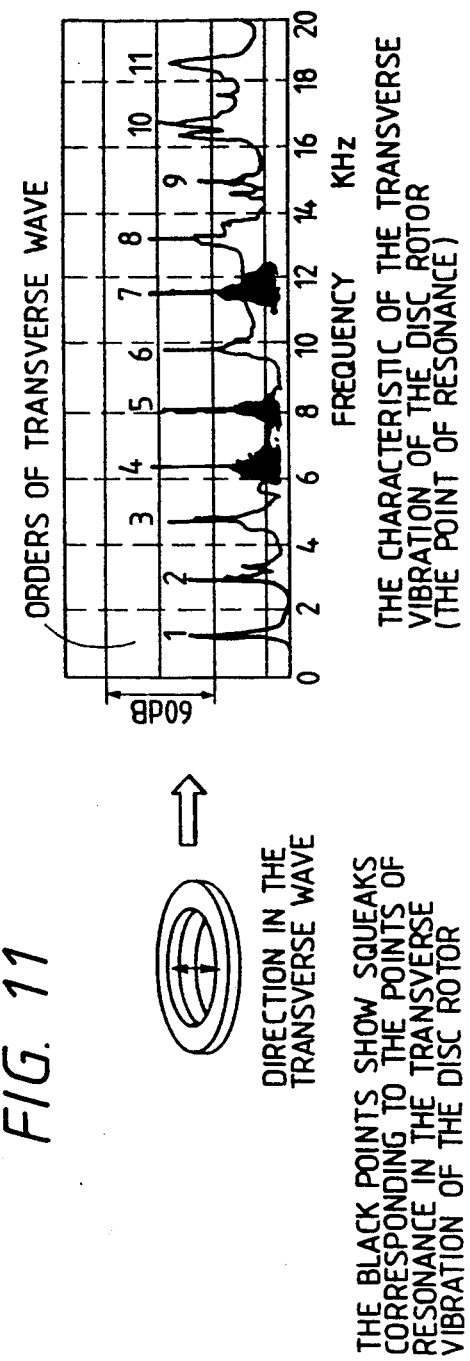
FIG. 9
FIG. 11
THE BLACK POINTS SHOW SQUEAKS CORRESPONDING TO THE POINTS OF RESONANCE IN THE TRANSVERSE VIBRATION OF THE DISC ROTOR THE FRICTION PADS MADE OF THE SEMI-METALLIC OR A NON-ASBESTOS MATERIAL
(THE SQUEAKS ARE BASED ON THE LONGITUDINAL VIBRATION)

THE FRICTION PADS MADE OF THE ORGANIC MATERIAL
(THE SQUEAKS ARE BASED ON THE TRANSVERSE VIBRATION)

SQUEAK PREVENTION FOR DISC BRAKE

This is a continuation of application Ser. No. 07/629,683, filed on Dec. 18, 1990, which was abandoned upon the filing hereof.

BACKGROUND OF THE INVENTION

The present invention relates to a device for effectively preventing squeak in a disc brake apparatus during the braking operation.

It has been known that in a disc brake apparatus whose disc rotor rotates together with an axle and is pinched by friction pads operated by a hydraulic actuator or the like to brake a vehicle, a very-unpleasant high-frequency noise referred to as a squeak is generated due to the hardness of the disc rotor, and the relationship between the properties of the rotor and the pads and so forth when the rotor is pinched by the pads during the braking operation. It has been confirmed that if the friction pads are comprised of an organic material whose main constituent is asbestos, the direction of the vibration of the disc rotor and that of the processing of the wave of the vibration are coincident with each other as well as the flexural or torsional vibration of a plate, as shown in FIG. 8, namely, the main component of of the vibration of the disc rotor is transverse vibration. FIG. 11 shows the characteristic of the transverse vibration of the disc rotor and indicates the points of resonance with regard to the transverse wave in the rotor. FIG. 12 shows the frequency and magnitude of the squeaks in the disc brake apparatus during the actual braking operation in the case that the friction pads are comprised of the organic material. It is apparent from the examination of FIGS. 11 and 12 that some of the squeaks correspond to the points of fourth-order, fifth-order and seventh-order resonance in the transverse vibration. To conventionally prevent such squeaks, an annular metal member is fitted on the peripheral surface of a disc rotor to shift the points of resonance as disclosed in the U.S. Pat. No. 3,286,788 and the GB patent No. 934,096, or a plurality of holes or grooves are provided in braking surfaces of a disc rotor to shift the points of resonance as shown in the Japanese Utility Model Application (OPI) No. 108,880/79 (the term "OPI" as used herein means an "unexamined published application").

However, since friction pads have been recently comprised of a semi-metallic or a non-asbestos material, squeaks in a disc brake apparatus cannot be prevented enough by the conventional transverse-vibration-suppressing countermeasures mentioned above. FIG. 10 shows the frequency and magnitude of the squeaks in the disc brake with the friction pads comprised of a semi-metallic or non-asbestos material. It has turned out that the relationship between the frequency and magnitude of the squeaks is very approximate to that (shown in FIG. 9) between the frequency and magnitude of the longitudinal vibration of the disc rotor of the disc brake apparatus, in which the rotor performs the vibration of expansion and contraction in the direction of the thickness thereof and the wave of the vibration proceeds in the circumferential direction of the rotor perpendicularly to the direction of the thickness thereof. It is understood through the comparison of FIGS. 9 and 10 that there are points of resonance at 8.4 kHz (second order), 12.6 kHz (fourth order) squeaks and the longitudinal vibration. As a result, it is concluded that the squeaks of the disc brake with the friction pads comprised of a semi-metallic or non-asbestos material are based on the longitudinal vibration of the disc rotor.

SUMMARY OF THE INVENTION

Accordingly, it is an object of the present invention to prevent squeaks from occurring due to the longitudinal vibration of the disc rotor of a disc brake apparatus employing friction pads which are comprised of a semi-metallic or a non-asbestos material and which are pushed onto the disc rotor to perform braking. To attain this objective, the disc rotor is divided so that the frequency of the second-order resonance of the rotor in the longitudinal vibration thereof is more than 15 khz which is the upper limit to the range of frequencies audible to humans. To be concrete, the disc rotor is divided by an integer greater than or equal to n expressed below.

$$n = 4712.4(0.512X + 25.148)/\sqrt{E/\rho}$$

wherein:
(X: the outside diameter (mm) of said rotor)
(E: the Young's modulus (dyn/cm$^2$) of said rotor)
($\rho$: weight density (g/cm$^3$) of the said rotor)

The smaller the developed length of the disc rotor of the disc brake apparatus according to the present invention is, the higher the frequency of the longitudinal vibration of the disc rotor is. Besides, the squeaks would occur at the point of second-order, fourth-order and sixth-order resonance in the longitudinal vibration. For these reasons, the disc rotor is divided by the above-mentioned prescribed number so that the frequency of second-order resonance in the longitudinal vibration is shifted to be higher than 15 kHz which is the upper limit to the range of frequencies audible to humans. As a result, the squeaks are made inaudible to humans.

BRIEF DESCRIPTION OF THE DRAWINGS

FIGS. 5A and 5B show a ventilated disc rotor divided by slits;

FIGS. 6A and 6B shows a disc rotor completely divided and then coupled by steel pieces;

FIGS. 7A and 7B show a disc rotor completely divided and then coupled by fitting the divided part of the rotor in the other divided part thereof;

FIG. 9 is a characteristic graph indicating the relationship between the frequency and magnitude of longitudinal vibration of a disc rotor;

FIG. 11 is a characteristic graph indicating the relationship between the frequency and magnitude of transverse vibration of a disc rotor.

DETAILED DESCRIPTION OF THE PREFERRED EMBODIMENT

It is known that the frequency f (Hz) of a longitudinal wave which propagates in a solid bar of l (cm) in length, E (dyn/cm$^2$) in Young's modulus and $\rho$ (g/cm$^3$) in weight density is generally expressed as follows:

$$f = V/\lambda = p\sqrt{E/\rho}\ /2l \tag{1}$$

In the equation (1), V, $\lambda$ and p denote the sound velocity (cm/s), the length (cm) of the longitudinal wave, and an integer which is the ordinal number (1, 2, 3, . . . or n) of the longitudinal wave, respectively. However, it turned out from experiments that since the disc rotor of the disc brake apparatus according to the present invention is circularly shaped and has no open end in the circumferential direction of the rotor, the frequency of a longitudinal wave which propagates in the rotor is not expressed by the equation (1) but as follows:

$$f = p\sqrt{E/\rho}\ /2l = p\sqrt{E/\rho}\ /2\pi D \tag{2}$$

Figure 1:
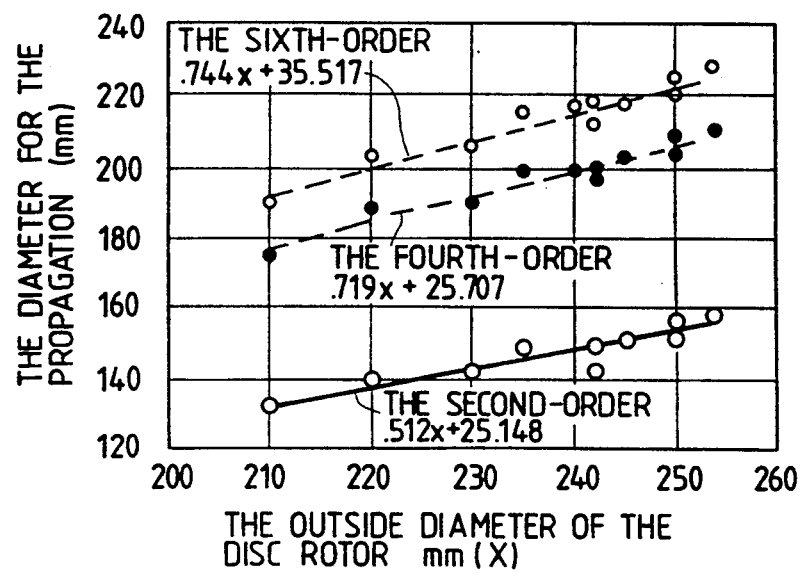
FIG. 1 is an experimentally obtained graph indicating the relationship between the sizes of disc rotors and the diameters for the propagation of longitudinal waves therein.
Figure 8:
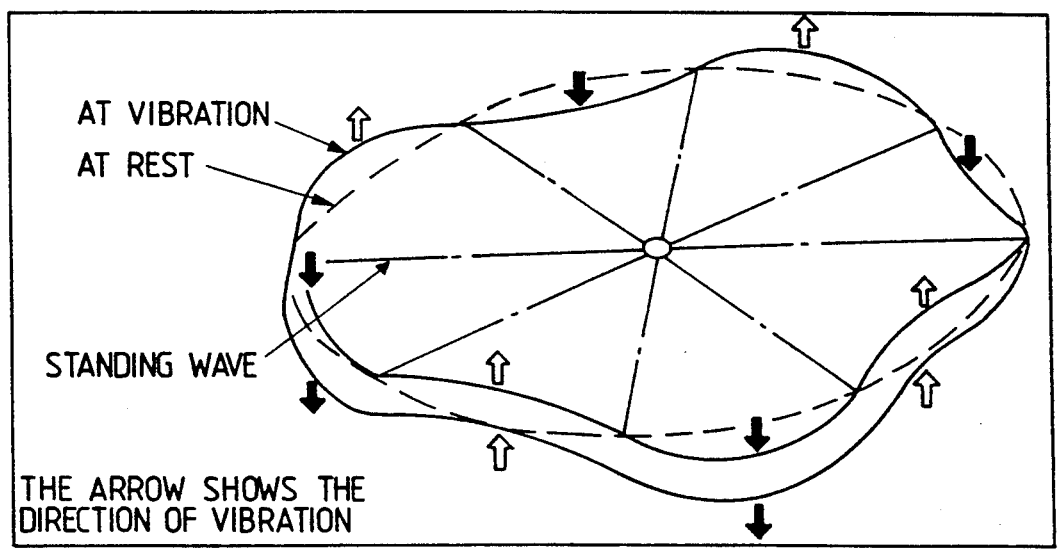
FIG. 8 shows the principle of transverse vibration.

In the equation (2), p denotes the ordinal number of the longitudinal wave but is an even number such as 2, 4 and 6, and D denotes the diameter (cm) at which the wave propagates in the disc rotor. It also turned out from the experiments that the diameter D and the outside diameter X of the disc rotor have a relationship between themselves as shown in FIG. 1.

According to the equation (2), the frequency of resonance of a disc rotor which is for an ordinary passenger car and is 260 mm in outside diameter is calculated to be 8,000 Hz, 12,000 Hz and 17,000 Hz for the second-order, the fourth-order and the sixth-order longitudinal waves in the disc rotor, respectively, and the frequency of resonance of a disc rotor which is for an ordinary passenger car and is 240 mm in outside diameter is calculated to be 9,500 Hz, 14,500 Hz and 19,000 Hz for the second-order, the fourth-order and the sixth-order longitudinal waves in the disc rotor, respectively. These frequencies are nearly equal to those of squeaks which actually occurred.

It is understood through the examination of the equation (2) that the frequency f increases if the longitudinal wave propagation length L equal to nD is decreased. Therefore, the propagation length L at which the frequency of resonance for the second-order longitudinal wave exceeds 15 kHz which is the upper limit to the range of frequency audible to humans can be determined as follows:

$$L = p\sqrt{E/\rho}\ /2f = \sqrt{E/\rho}\ /f = \sqrt{E/\rho}\ /15,000$$

This equation means that the frequency f becomes higher than 15 kHz if the propagation length L is set to be less than $\sqrt{E/\rho}/15,000$. For that reason, such a minimum division number n as to divide the circumferential length nD for the longitudinal wave propagation diameter D of the disc rotor of X in outside diameter to make the developed length of each divided part of the rotor less than L can be identified with the first integer greater than or equal to n is found If the number n is equal to the value of $\pi D/L$, the number is expressed as follows:

$$n = \pi D/L = 15,000/\sqrt{E/\rho}\cdot(0.512X + 25.148)\pi/10$$
$$= 4712.4(0.512X + 25.148)/\sqrt{E/\rho}$$

The minimum division number n for preventing the generation of squeaks audible to humans can thus be determined for the disc rotors of 240 mm and 260 mm in outside diameter X for the passenger cars as follows:

$n = 1.65$ (for $X = 240$ mm)

$n = 1.77$ (for $X = 260$ mm)

In that case, the Young's modulus E and weight density $\rho$ of the disc rotors are supposed to be $12.8 \times 10^{11}$ dyn/cm$^2$ and 7.2 g/cm$^3$, respectively. The first integer greater than or equal to n is found. As a result, the number becomes 2.

Dividing such disc rotors is concretely described with reference to FIGS. 2, 3, 4, 5, 6 and 7 from now on.

Figure 2A:
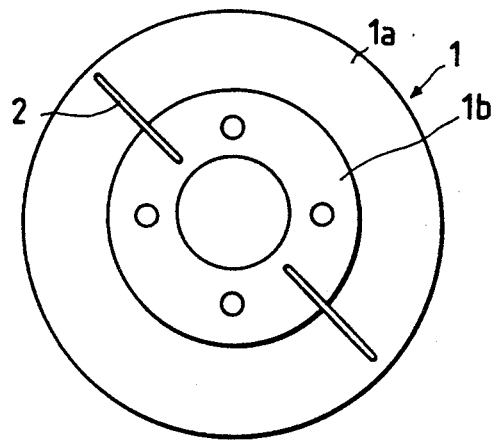
FIGS. 2A, 2B, 3A, 3B, 4A and 4B show front and side views of the disc rotors divided by slits.
Figure 2B:
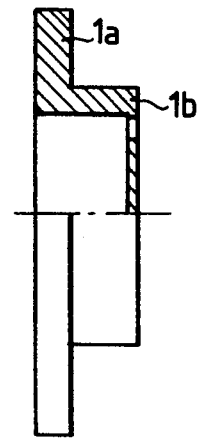

FIGS. 2A and 2B show a disc rotor 1 provided with two slits 2 extending from the braking surface 1a of the rotor to the hub 1b thereof and positioned at an angular interval of 180 degrees. The slits 2 have the same form.

Figure 3A:
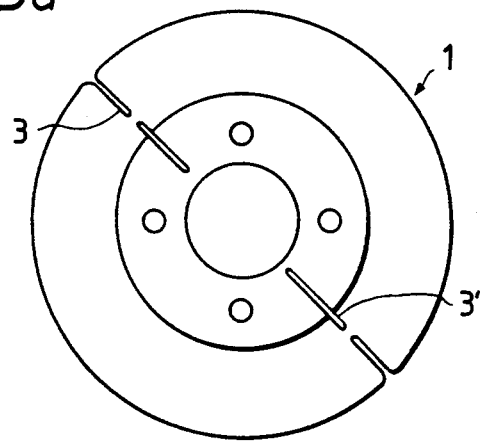
Figure 3B:
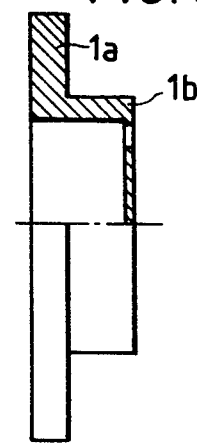

FIGS. 3A and 3B shows a disc rotor 1 provided with inner and outer slits 3 and 3' extending in the radial direction of the rotor and positioned at an angular interval of 180 degrees. The outer slits extend from the peripheral edge of the disc rotor to the vicinities of the inner slits which extend from the braking surface 1a of the rotor to the hub 1b thereof.

Figure 4A:
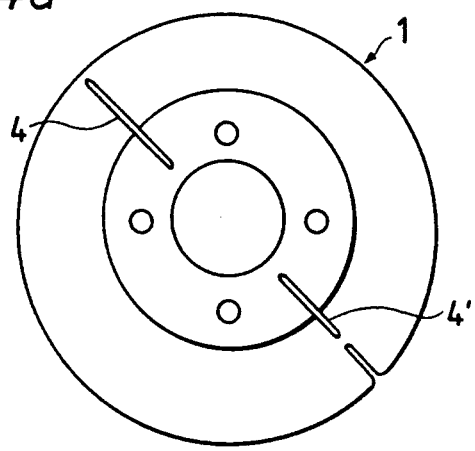
Figure 4B:
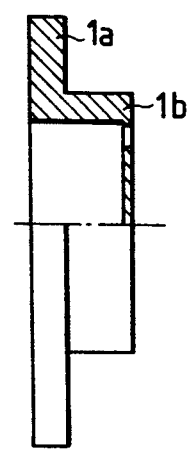
Figure 10:
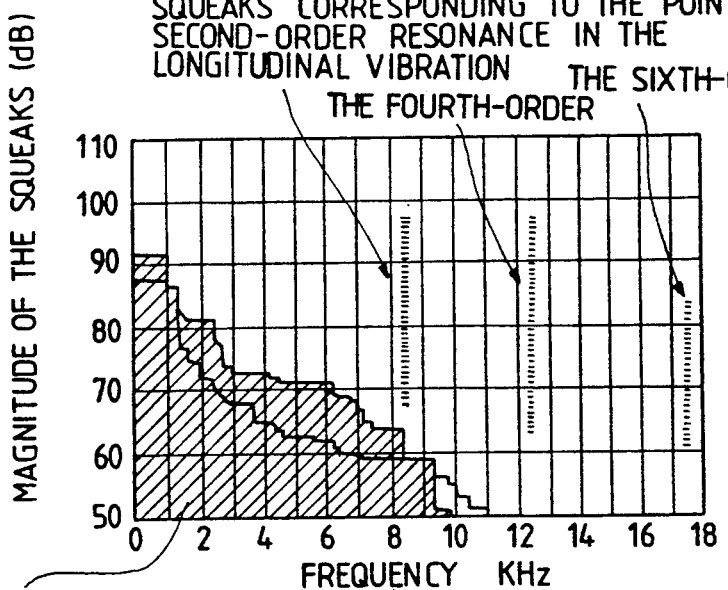
FIG. 10 is a characteristic graph indicating the relationship between the frequency and magnitude of squeaks which occur in actual braking operation by using friction pads of a semi-metallic or non-asbestos material.
Figure 12:
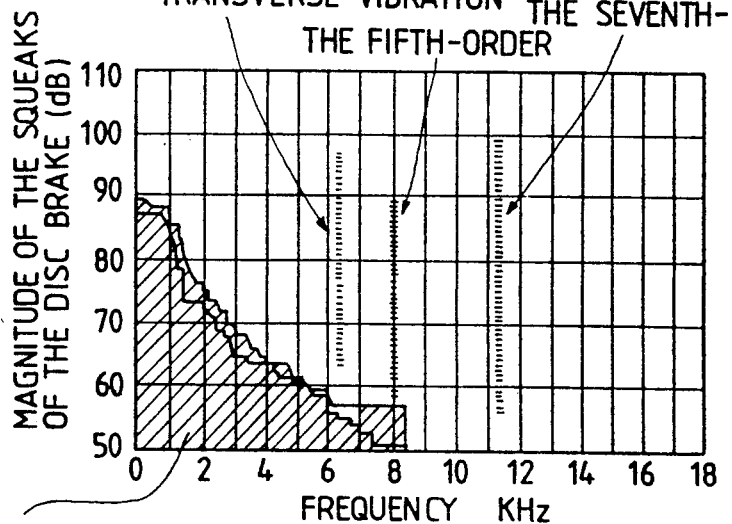
FIG. 12 is a characteristic graph indicating the relationship between the frequency and magnitude of squeaks which occur in actual braking operation by using friction pads of the organic material.

FIGS. 4A and 4B shows a disc rotor 1 provided with two slits 4 and 4' extending from the braking surface 1a of the rotor to the hub 1b thereof and positioned at an angular interval of 180 degrees. The rotor 1 is also provided with a slit extending from the peripheral edge of the rotor to the vicinity of the slit 4'.

FIGS. 5A and 5B shows a ventilated disc rotor 5 provided with slits positioned in the inside braking surface 5a and 5b of the rotor and similar to those shown in FIGS. 2, 3 and 4. The angular interval between each of the slits positioned in the inside braking surface 5a and each of those positioned in the outside braking surface 5b may be either zero degree or 90 degrees.

The width of each of the slits shown in FIGS. 2, 3, 4 and 5 depends on the size and form of the disc rotor. However, it is preferable that the width is 4 mm or less.

FIGS. 6A and 6B shows a disc rotor completely divided and then coupled by steel pieces 6 inserted into the divided parts of the rotor and secured thereto by calking or the like.

FIG. 7 shows a disc rotor completely divided and then coupled by fitting portions 7 of the divided part of the rotor in the other divided part thereof.

Although each of the disc rotors shown in FIGS. 2A, 3A, 4A, 5A, 6A and 7 is divided so that the divided parts of the rotor are equal to each other, the rotors may be divided in any manner as long as the developed length of each divided part of the rotor is such as to make the frequency of resonance for the second-order longitudinal wave in the rotor higher than 15 kHz.

According to the present invention, a disc rotor is divided so that the frequency of the longitudinal wave second-order resonance, which would first occur as a squeak which is a brake noise, is made higher than the upper limit to the range of human-audible frequency by utilizing the fact that the frequency of resonance for the longitudinal wave which propagates in a body increases if the length of the body is decreased. The squeak is thus made inaudible to humans.

What is claimed is:

1. A disc brake apparatus for preventing squeak comprising:
   a disc rotor having at least one division, the number of said divisions being determined by the equation $$n = 4712.4 \, (0.512X + 25.148) / (E/\rho)^{\frac{1}{2}}$$

where
   $X$ = the outside diameter (mm) of said rotor
   $E$ = Young's Modululs (dyn/cn$^2$) of said rotor and
   $\rho$ = the weight density (g/cm$^3$) of said rotor said at least one division being spaced about the circumference of said disc rotor so that the frequency of a second order resonance of a longitudinal vibration of said disc rotor is higher than 15 kHz, the number of divisions being an integer greater than or equal to n; and
   friction pads made of non-asbestos material adapted to be pressed against said disc rotor to perform braking.

2. A disc brake apparatus according to claim 1, wherein said disc rotor is provided with radial slits creating the divisions of said disc rotor.

3. A disc brake apparatus according to claim 1, wherein said disc rotor is a ventilated disc rotor having an inside braking surface and outside braking surface parted by a ventilating gap, said ventilated disc rotor provided with radial slits on said inside braking surface and said outside braking surface for dividing said inside surface and said outside surface thereof.

4. A disc brake apparatus according to claim 1, wherein the disc rotor is divided into two symmetrical halves so as to form distinct pieces, said pieces so coupled by steel pieces to form the divisions of said disc rotor.

5. A disc brake apparatus according to claim 1 wherein said disc rotor is separated into a first and second piece, said first piece then being coupled to said second piece by fitting said first piece into said second piece, to reform said disc rotor having at least one division.

6. A disc brake apparatus according to claim 1, wherein said friction pad is made of semi-metallic material.

* * * * *